US007311603B2

(12) United States Patent
Walker et al.

(10) Patent No.: US 7,311,603 B2
(45) Date of Patent: Dec. 25, 2007

(54) ELECTRONIC AMUSEMENT DEVICE AND METHOD FOR OPERATING A GAME OFFERING CONTINUOUS REELS

(75) Inventors: Jay S. Walker, Ridgefield, CT (US); James A. Jorasch, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 303 days.

(21) Appl. No.: 11/160,092

(22) Filed: Jun. 8, 2005

(65) Prior Publication Data

US 2005/0221885 A1 Oct. 6, 2005

Related U.S. Application Data

(63) Continuation of application No. 10/391,034, filed on Mar. 17, 2003, now abandoned, which is a continuation of application No. 09/578,261, filed on May 24, 2000, now Pat. No. 6,579,178, which is a continuation of application No. 09/056,489, filed on Apr. 7, 1998, now Pat. No. 6,095,921.

(51) Int. Cl.
*G07F 17/34* (2006.01)
*A63F 13/00* (2006.01)

(52) U.S. Cl. .................. 463/20; 273/143 R; 273/138.2

(58) Field of Classification Search ............ 273/143 R, 273/138.1, 138.2, 142 R–142 K, 143 A–143 E; 463/1, 20, 31–34

See application file for complete search history.

(56) References Cited

U.S. PATENT DOCUMENTS

| | | | | |
|---|---|---|---|---|
| 3,533,629 A | 10/1970 | Raven | 273/138 |
| 3,580,581 A | 5/1971 | Raven | 273/138 A |
| 3,770,269 A | 11/1973 | Elder | 273/1 E |
| 4,448,419 A | 5/1984 | Telnaes | 273/143 R |
| 4,508,345 A | 4/1985 | Okada | 273/143 R |
| 4,648,600 A | 3/1987 | Olliges | 273/138 A |
| 4,712,799 A | 12/1987 | Fraley | 273/138 A |
| 4,790,537 A | 12/1988 | Smyth et al. | 273/143 R |
| 4,836,546 A | 6/1989 | DiRe et al. | 273/138 A |
| 5,102,134 A | 4/1992 | Smyth | 273/138 A |

(Continued)

FOREIGN PATENT DOCUMENTS

EP 219305 A2 * 4/1987

(Continued)

OTHER PUBLICATIONS

Edwards, John G., "Slots no longer just spinning their wheels", Las Vegas Review-Journal, Oct. 13, 1997, Section: D, p. 1D.

*Primary Examiner*—Benjamin Layno
(74) *Attorney, Agent, or Firm*—Walker Digital Management, LLC

(57) ABSTRACT

A gaming device and method for controlling operating the gaming device is disclosed. The gaming device initiates a paid play, and determines an outcome of the play. The outcome is visually displayed using at least two graphical displays. The graphical displays comprise a first and second visual continuum, without discrete reel stops. The outcome is represented by the relative positions of the first and second visual continuums. The outcome may also be based on the relative position of the first and second continuums to a payline. A payout corresponding to the outcome is determined by the device, and is awarded to the player.

27 Claims, 17 Drawing Sheets

U.S. PATENT DOCUMENTS

| | | | | | |
|---|---|---|---|---|---|
| 5,127,651 | A | * | 7/1992 | Okada | 273/143 R |
| 5,152,529 | A | | 10/1992 | Okada | 273/143 R |
| 5,205,555 | A | | 4/1993 | Hamano | 273/143 R |
| 5,373,440 | A | | 12/1994 | Cohen et al. | 364/410 |
| 5,395,111 | A | | 3/1995 | Inoue | 273/143 R |
| 5,423,539 | A | | 6/1995 | Nagao | 273/143 R |
| 5,456,465 | A | | 10/1995 | Durham | 273/138 A |
| 5,524,888 | A | | 6/1996 | Heidel | 463/22 |
| 5,580,055 | A | | 12/1996 | Hagiwara | 273/143 R |
| 5,655,965 | A | | 8/1997 | Takemoto et al. | 463/20 |
| 5,791,989 | A | | 8/1998 | Slinkman | 463/12 |
| 5,833,537 | A | | 11/1998 | Barrie | 463/21 |
| 6,095,921 | A | | 8/2000 | Walker et al. | 463/20 |
| 6,173,955 | B1 | | 1/2001 | Perrie et al. | 273/146 |

FOREIGN PATENT DOCUMENTS

| | | | | |
|---|---|---|---|---|
| GB | 2 089 086 | A | | 6/1982 |
| GB | 2147442 | A | * | 5/1985 |
| GB | 2183882 | A | * | 6/1987 |
| GB | 2 190 227 | A | | 11/1987 |

* cited by examiner

126

| | RANDOM NUMBER 150 | OUTCOME 152 | EXPECTED HITS PER CYCLE 154 |
|---|---|---|---|
| 183a | 1-8570 | NONWINNING COMBINATION | 8570 |
| 183b | 8571-9250 | CHERRY/ANY/ANY | 680 |
| 183c | 9251-9930 | ANY/ANY/CHERRY | 680 |
| 183d | 9931-10130 | CHERRY/CHERRY/ANY | 200 |
| 183e | 10131-10330 | ANY/CHERRY/CHERRY | 200 |
| 184f | 10331-10398 | CHERRY/ANY/CHERRY | 68 |
| 183g | 10399-10418 | CHERRY/CHERRY/CHERRY | 20 |
| 183h | 10419-10460 | BAR/ORANGE/ORANGE | 42 |
| 183i | 10461-10466 | ORANGE/ORANGE/BAR | 6 |
| 183j | 10467-10508 | ORANGE/ORANGE/ORANGE | 42 |
| 183k | 10509-10528 | BAR/PLUM/PLUM | 20 |
| 183l | 10529-10533 | PLUM/PLUM/BAR | 5 |
| 183m | 10534-10583 | PLUM/PLUM/PLUM | 50 |
| 183n | 10584-10587 | BAR/BELL/BELL | 4 |
| 184o | 10588-10607 | BELL/BELL/BAR | 20 |
| 183p | 10608-10627 | BELL/BELL/BELL | 20 |
| 183q | 10628-10647 | BAR/BAR/BAR | 20 |
| 183r | 10648 | 7/7/7 | 1 |

PRIOR ART

FIG. 2A

128

| | OUTCOME 152 | EXPECTED HITS PER CYCLE 154 | PAY AMOUNT | | |
|---|---|---|---|---|---|
| | | | FIRST COIN 164 | SECOND COIN 166 | THIRD COIN 168 |
| 185a | NONWINNING COMBINATION | 8570 | 0 | 0 | 0 |
| 185b | CHERRY/ANY/ANY | 680 | 2 | 4 | 6 |
| 185c | ANY/ANY/CHERRY | 680 | 2 | 4 | 6 |
| 185d | CHERRY/CHERRY/ANY | 200 | 5 | 10 | 15 |
| 185e | ANY/CHERRY/CHERRY | 200 | 5 | 10 | 15 |
| 185f | CHERRY/ANY/CHERRY | 68 | 5 | 10 | 15 |
| 185g | CHERRY/CHERRY/CHERRY | 20 | 20 | 40 | 60 |
| 185h | BAR/ORANGE/ORANGE | 42 | 10 | 20 | 30 |
| 185i | ORANGE/ORANGE/BAR | 6 | 10 | 20 | 30 |
| 185j | ORANGE/ORANGE/ORANGE | 42 | 20 | 40 | 60 |
| 185k | BAR/PLUM/PLUM | 20 | 14 | 28 | 42 |
| 185l | PLUM/PLUM/BAR | 5 | 14 | 28 | 42 |
| 185m | PLUM/PLUM/PLUM | 50 | 20 | 40 | 60 |
| 185n | BAR/BELL/BELL | 4 | 18 | 36 | 54 |
| 185o | BELL/BELL/BAR | 20 | 18 | 36 | 54 |
| 185p | BELL/BELL/BELL | 20 | 20 | 40 | 60 |
| 185q | BAR/BAR/BAR | 20 | 50 | 100 | 150 |
| 185r | 7/7/7 | 1 | 100 | 200 | 300 |

PRIOR ART

FIG. 2B

127

| | RANDOM NUMBER 170 | OUTCOME 172 | EXPECTED HITS PER CYCLE 174 |
|---|---|---|---|
| 187a | 10461-10466 | 5.500 - 6.000 | 6 |
| 187b | 10419-10460 | 5.000 - 5.499 | 42 |
| 187c | 10399-10418 | 4.500 - 4.999 | 20 |
| 187d | 10331-10398 | 4.000 - 4.499 | 68 |
| 187e | 10131-10330 | 3.500 - 3.999 | 200 |
| 187f | 9931-10130 | 3.000 - 3.499 | 200 |
| 187g | 9251-9930 | 2.500 - 2.999 | 680 |
| 187h | 8571-9250 | 2.000 - 2.499 | 680 |
| 187i | 1-8570 | 0.000 - 1.999 | 8570 |

FIG. 3A

129

| | OUTCOME 172 | EXPECTED HITS PER CYCLE 174 | PAY AMOUNT | | |
|---|---|---|---|---|---|
| | | | FIRST COIN 176 | SECOND COIN 178 | THIRD COIN 180 |
| 136a | 5.500 - 6.000 | 6 | 350 | 700 | 1050 |
| 136b | 5.000 - 5.499 | 20 | 250 | 500 | 750 |
| 136c | 4.500 - 4.999 | 42 | 100 | 200 | 300 |
| 136d | 4.000 - 4.499 | 68 | 75 | 150 | 225 |
| 136e | 3.500 - 3.999 | 200 | 40 | 80 | 120 |
| 136f | 3.000 - 3.499 | 200 | 20 | 40 | 60 |
| 136g | 2.500 - 2.999 | 680 | 10 | 20 | 30 |
| 136h | 2.000 - 2.499 | 680 | 5 | 10 | 15 |
| 136i | 0.000 - 1.999 | 8570 | 0 | 0 | 0 |

FIG. 3B

ELECTRONIC AMUSEMENT DEVICE AND METHOD FOR OPERATING A GAME OFFERING CONTINUOUS REELS

CROSS-REFERENCE TO RELATED APPLICATION

The present Application is a Continuation of commonly-owned U.S. patent application Ser. No. 10/391,034, entitled "ELECTRONIC AMUSEMENT DEVICE AND METHOD FOR OPERATING A GAME OFFERING CONTINUOUS REELS", filed Mar. 17, 2003, now abandoned which is a Continuation of commonly-owned U.S. patent application Ser. No. 09/578,261, filed May 24, 2000, which issued as U.S. Pat. No. 6,579,178 B1 on Jun. 17, 2003; which is Continuation of commonly-owned U.S. patent application Ser. No. 09/056,489, filed Apr. 7, 1998, which issued as U.S. Pat. No. 6,095,921 on Aug. 1, 2000; all of which are incorporated by reference herein.

FIELD OF THE INVENTION

The present invention relates an electronic amusement apparatus and more particularly to an electronic amusement apparatus such as a slot machine having continuous reels.

BACKGROUND OF THE INVENTION

Slot machines are the primary revenue source of most casinos, with machines often earning between fifty and one hundred fifty dollars per day. Because of the profitability of such slot machine use, casinos have begun to market aggressively to both retain existing customers and attract new players—often by offering increasingly high jackpot payouts. Players find higher jackpots more exciting, and will seek out those casinos offering the best rates. Increasing the payouts, however, has a negative impact on the profitability of the machines. In order to maintain a reasonable profit margin for the house in the face of increasing jackpot amounts, casinos were forced to decrease the probability of hitting the top jackpots by reducing the ratio of winning symbols to losing symbols. Although reducing the number of jackpot symbols per reel achieved this end, slot machines were eventually left with very few jackpot symbols per reel. In order to further decrease the probability of hitting the top jackpot, slot machine manufacturers began to increase the number of stops per reel, allowing for less frequent jackpots. More reel stops, however, required physically larger reels and thus larger machines. These larger machines reduced the number of machines that could be fit onto the casino floor, reducing the casino win.

Virtual reel technology, such as the technology disclosed by U.S. Pat. No. 4,448,419 of Telnaes, alleviated some of these problems by providing an electronic reel which operated in combination with the physical reel. Outcomes were determined by the internal electronic reel and then simply displayed by the physical reel. While the physical reel might contain two jackpot symbols and twenty non-jackpot symbols, the virtual reel might have one jackpot symbol and ninety-nine non-jackpot symbols. In this manner, the probability of the reel stopping on a particular symbol such as a lemon was completely determined by the relative frequency of the lemon on the virtual reel—not the physical reel. The benefit of this technology was that the slot machine could now have small physical reels while maintaining an electronic reel with far more reel stops, allowing low frequency of jackpot symbols to support high payouts. The player of such a machine, however, is completely unaware of the virtual reel and tends to assume that the physical reel determines the outcome. He might see an equal number of jackpot symbols and oranges, yet discover that the jackpot symbols "never seem to come up" while the oranges come up frequently. Such an imbalance often leads to the player concluding that the machine is "rigged" to not pay off.

In addition to the misleading probabilities described above, conventional slot machine reels also often fail to provide the player with a satisfying entertainment experience. After seeing the first two reels stop spinning and realizing that there are no longer any possible symbols on the third reel that result in a payout, players are discouraged. Watching the third reel spin is a waste of time when there is no way for a player to win.

Thus, it would be very desirable to provide a slot machine that offers players the ability to play a game of chance having a seemingly endless number of potential outcomes. Such a slot machine would retain a player's interest for longer periods of time, making the game more enjoyable.

SUMMARY OF THE INVENTION

An object of the present invention is to provide a slot machine that prevents a player from accurately predicting an outcome until the entire outcome is displayed.

A feature of the present invention is that the disclosed slot machine provides entertainment while the reels are spinning.

An advantage of the present invention is that the disclosed slot machine provides prolonged anticipation regarding the outcome, thus making the game more exciting for players.

In accordance with one aspect of the present invention, a method for operating a gaming device is disclosed. The method includes the step of initiating a paid play. This step is typically performed in response to a user-generated signal such as that generated by the pull of a handle. The method also includes the step of determining an outcome of the paid play.

The method further includes the step of visually displaying the outcome using at least two graphical displays. Each graphical display comprises a visual continuum. The visual continuums may be visual continuums of color, shade, or physical dimension. The outcome is represented by the relative positions of the visual continuums. In addition, the method includes the step of determining a payout based on the outcome.

Alternate embodiments of the present invention, employing overlapping displays and animated displays, are also disclosed. Electronic gaming devices are disclosed for implementing the steps of the described methods.

The above objects, features and advantages as well as other objects, features and advantages are readily apparent from the detailed description when taken in connection with the accompanying drawings.

BRIEF DESCRIPTION OF THE DRAWINGS

These and other objects, features and advantages of the invention will be understood from a consideration of the following description of the invention, in which:

FIG. 2A is a table showing components of a prior art probability table;

FIG. 2B is a table showing components of a prior art payout table;

FIG. 3A is a table showing components of the probability table of FIG. 1;

FIG. 3B is a table showing components of the payout table of FIG. 1;

FIG. 4G is an illustration of an animation of the interrelated elements of FIG. 4F, in accordance with one embodiment of the present invention.

DESCRIPTION OF THE INVENTION

Description of the System

In accordance with the present invention there is provided herein a gaming method and apparatus, illustrated by way of a slot machine, for presenting a gaming outcome using at least two visual continuums. As used herein, the term "slot machine" means all gaming machines wherein a paid play generates a random or pseudo-random outcome used to determine a payout which is visually represented to the player.

Figure 1:
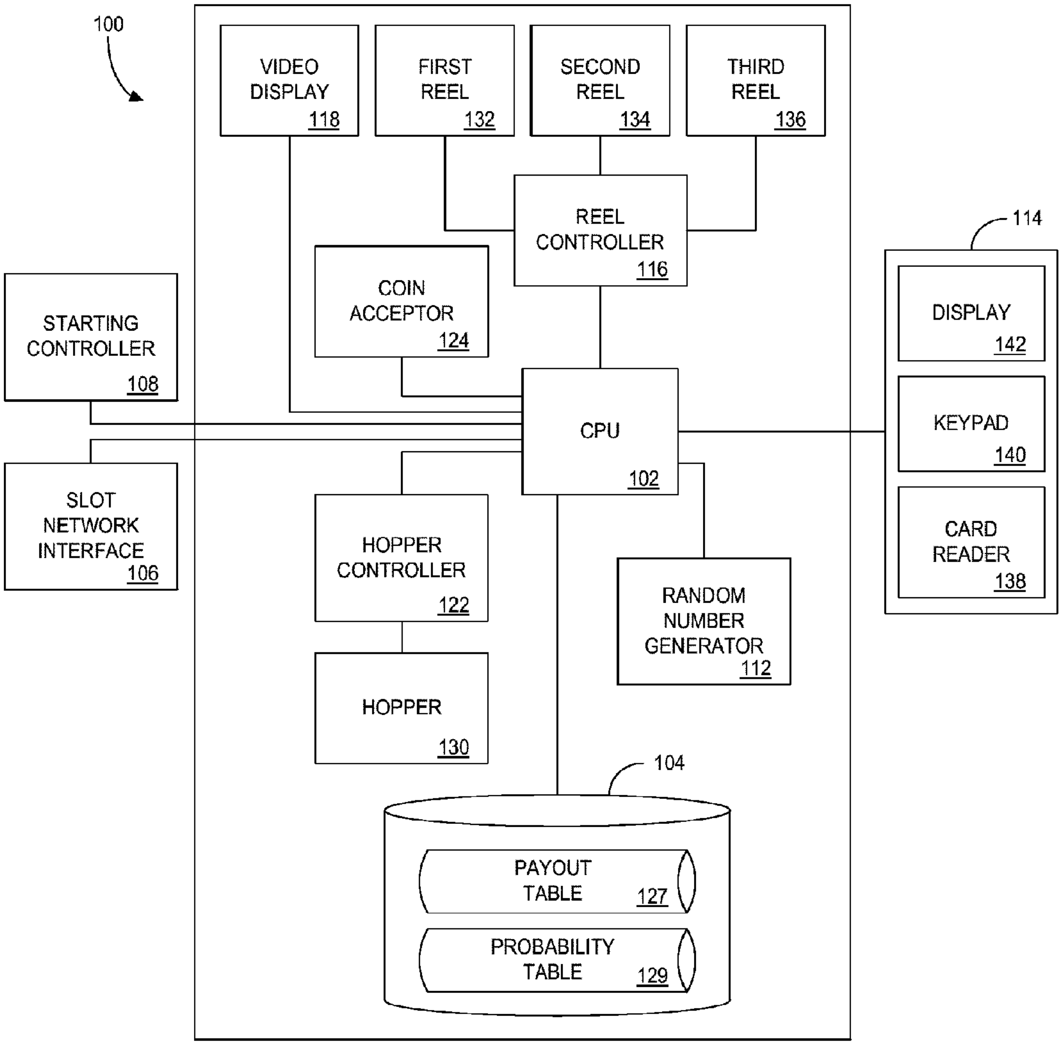
FIG. 1 is a block diagram of a slot machine constructed in accordance with the present invention.

Referring now to FIG. 1, there is shown a block diagram of an exemplary slot machine 100 including a central processing unit ("CPU") 102 and a data storage device 104 connected to the CPU. Further connected to CPU 102 are: a slot network interface 106, a starting controller 108, a random number generator 112, a reel controller 116, a video display 118, a hopper controller 122, and a coin acceptor 124.

Slot machine 100 comprises conventional components, with the exception of reels 132, 134, and 136 and the two tables—probability table 127 and a payout table 129 contained in data storage device 104. As will be described in detail below, probability table 127 and payout table 129 function to determine the payout of the slot machine in accordance with the present invention. For purposes of better illustrating the invention, standard components, well known to those skilled in the art, are described only briefly. Although the present embodiment of the invention is described as implemented with physical components, the invention applies equally well to and includes software embodiments such as would be implemented on the Internet and other computer data networks.

Referring again to CPU 102, the device comprises one of many well known processing units, for example a Pentium class CPU manufactured by Intel Corp. Data storage device 104 comprises an appropriate combination of magnetic and optical memory, such as disk drive memory, and semiconductor memory such as random access memory (RAM) and read only memory (ROM). In addition to probability table 127 and payout table 129, data storage device 104 stores appropriate operating system and control software (not shown), functional to operate slot machine 100 in the manner described below. Random number generator 112 comprises one of many well known random or pseudo-random number generators suitable for use in a gaming device. Those of ordinary skill in the art will appreciate that although described as a separate component, random number generator 112 could be embodied in software form and executed by CPU 102. As will be further described below, during game play, data storage device 104 also stores player credit totals and values associated with the outcomes generated.

Coin acceptor 124 is operative to receive one or more coins, and to transmit an appropriate value signal to CPU 102. Hopper controller 122, and hopper 130 connected thereto, are operative under the control of CPU 102 to dispense and output coins to a player. Reel controller 116 is operative to control the spin and outcome displayed by first, second, and third reels 132, 134, 136, respectively, which may be mechanical in nature, or graphically displayed on video display 118. Each of the reels 132, 134, 136 supports a reel strip with indicia as described further below with reference to FIGS. 4A-F. Video display 118 comprises any appropriate video display apparatus, for example, a cathode ray tube or a liquid crystal display screen.

Starting controller 108 comprises a player-operated device such as a handle or button for initiating the play of a game. Player tracking device 114 comprises a conventional player interface including a card reader 138 for receiving a player tracking card, a display 142 for communicating alpha/numeric messages to the player, and a keypad 140 for receiving player input such as a player identifier.

Slot network interface 106 comprises a conventional network interface for connecting slot machine 100 to a centrally controlled network consisting of multiple machines, enabling functions further described below.

Referring now to FIG. 2A, a prior art probability table 126 is described with eighteen records indicated at 183*a*-183*r*, each record including three fields: a random number field 150, an outcome field 152, and a ("hits") field 154. Probability tables generally serve to transform the random number generated by the slot machine into a particular outcome. The selection of the data for probability table 126 is performed in a manner well known to those skilled in the art and yields a house advantage sufficient to produce a predetermined level of profit for the operator of the slot machine. The contents of table 126 have been reproduced herein from Regan, Jim, *Winning At Slot Machines*, Carol Publishing Group Edition, 1996. One skilled in the art will recognize the table as conventional for a twenty-two stop machine. Random number field 150 of each record indicates a range of random numbers. For example, record 183*d* indicates a range of random numbers from 9931 through 10130. Outcome field 152 indicates a reel indicia combination for each random number range, the outcome for record 183*d* comprising "Cherry/Cherry/Any", the "Any" constituting any reel indicia other than Cherry. Thus, when the random number generator generates a random number in the range of 9931 through 10130 for a game play, the reel controller directs the reels to display the described Cherry/Cherry/Any outcome.

Continuing with reference to FIG. 2A, hits field 154 includes the theoretical number of times a particular random number range and corresponding combination will occur, out of a total of 10,648 plays in a cycle. Thus, with reference again to record 183*d*, a random number in the range of 9931 through 10130 will occur, resulting in a Cherry/Cherry/Any outcome, two hundred times out of every 10,648 game plays. Each other record 183*a-r* in table 126 is interpreted in a like manner.

Referring now to FIG. 2B, there is described a prior art payout table 128 which serves to associate a generated outcome with its corresponding payout. Payout table 128 is shown to include eighteen records 185*a*-185*r*, each of which includes five fields: outcome 152 and expected hits per cycle fields 154, which are identical to the like-numbered fields from FIG. 2A, a first coin pay amount field 164, a second coin pay amount field 166, and a third coin pay amount field 168. Pay amount fields 164, 166, 168 represent the number of coins awarded for a particular outcome 152 for a given number of coins wagered. With reference to record 185*n*, an outcome of Bar/Bell/Bell results in a payout of thirty-six coins when two coins have been wagered.

With reference now to FIG. 3A, there is shown enhanced probability table 127 of the present invention. Each record of enhanced probability table 127 contains data describing a family of numerical outcomes. Such numerical outcomes may represent a physical dimension, such as width or wavelength, or may represent an abstract value such as a sum of numbers. This table includes nine records 187*a-i*, each including three fields: random number field 170, outcome field 172, and expected hits per cycle field 174. Random number field 170 and expected hits per cycle field 174 are similar to random number field 150 and expected hits per cycle field 154 of FIG. 2A. Outcome field 172 is significantly different, however. Instead of indicating discrete reel symbols to display, outcome field 172 represents a range of possible values. With reference to record 187*h*, a random number generated in the range of 8571 to 9250 corresponds to an outcome 172 of "2.000-2.499." No identification need be made of the individual reel results, and no precise indication need be made of the outcome. CPU 102 directs reel controller 116 to spin reels 132, 134, and 136 until the combined total of each of the three reels is within the range of 2.00 to 2.499. It should be noted that there are a virtually unlimited number of ways of representing the outcome, limited only by the precision with which values may be processed by CPU 102. With sufficient processing power, for example, outcome 172 of record 187*h* could be "2.00000000-2.49999999." Although outcome field 172 indicates the range of possible total values for the three reels in combination, those of ordinary skill in the art will appreciate that there could be a corresponding outcome field 172 for each reel. Hits field 174 is not essential to the operation of the present invention and is shown only to clarify the production of outcome 172.

In another embodiment of probability table 127, random number field 170 and outcome field 172 are combined so that the number generated by random number generator 112 is used directly as outcome 172. Random number generator 112 would be programmed to generate values no less than 0.000and no more than 6.000.

Although random number field 170 and outcome field 172 have been described in reference to a particular embodiment, it should be noted that the fields could be modified to support the alternate outcome forms as described below.

Turning now to FIG. 3B, enhanced payout table 129 is shown including nine records 136*a*-136*i*, each including five fields: outcome field 172 and expected hits per cycle field 174, corresponding to the like-numbered fields in FIG. 3A, a first coin pay amount 176, a second coin pay amount 178, and a third coin pay amount 180. In contrast to payout table 128 of FIG. 2B, outcome field 172 comprises a range of values.

Although presented as separate tables, probability table 127 and payout table 129 may be combined into a single table as will be apparent to those of ordinary skill in the art.

Figure 4A:
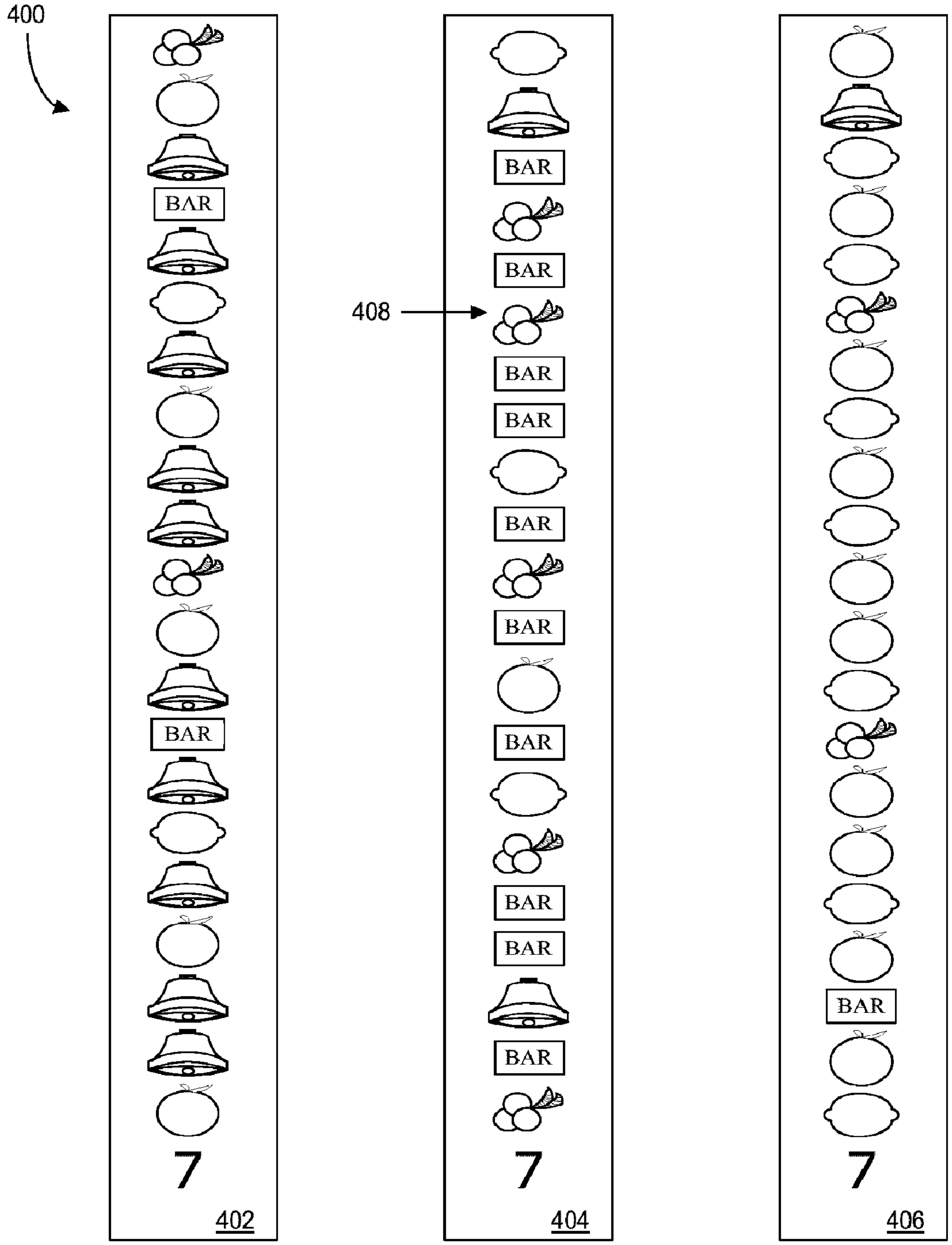
PRIOR ART FIG. 4A
FIG. 4A is a reel strip configuration of the prior art showing a twenty-two stop reel.

Referring now to FIG. 4A, there is shown a conventional reel strip set 400, consistent with the prior art, containing three reel strips 402, 404, and 406. These reel strips are configured in a circular arrangement so that they may be attached to the reel mechanisms of the slot machine. After an outcome is determined, stepper motors within the slot machine rotate the reel mechanism until the desired reel strip symbol appears at a payline position. Players typically view the reel symbols through a small transparent area on the face of the slot machine. Imprinted on the viewing area is a payline which indicates the relevant portion of the reel for determination of the final outcome. In this embodiment, each reel strip 402, 404, and 406 contains a total of twenty-two reel stops printed with indicia such as the identified symbol 408 which is a cherry. Although the symbol arrangement of each reel strip may be identical, many slot machines incorporate varying symbol types so that, for example, the frequency of jackpot symbols is higher on the first two reels than the last reel. Slot machines may also accommodate more or fewer reels as desired.

Figure 4B:
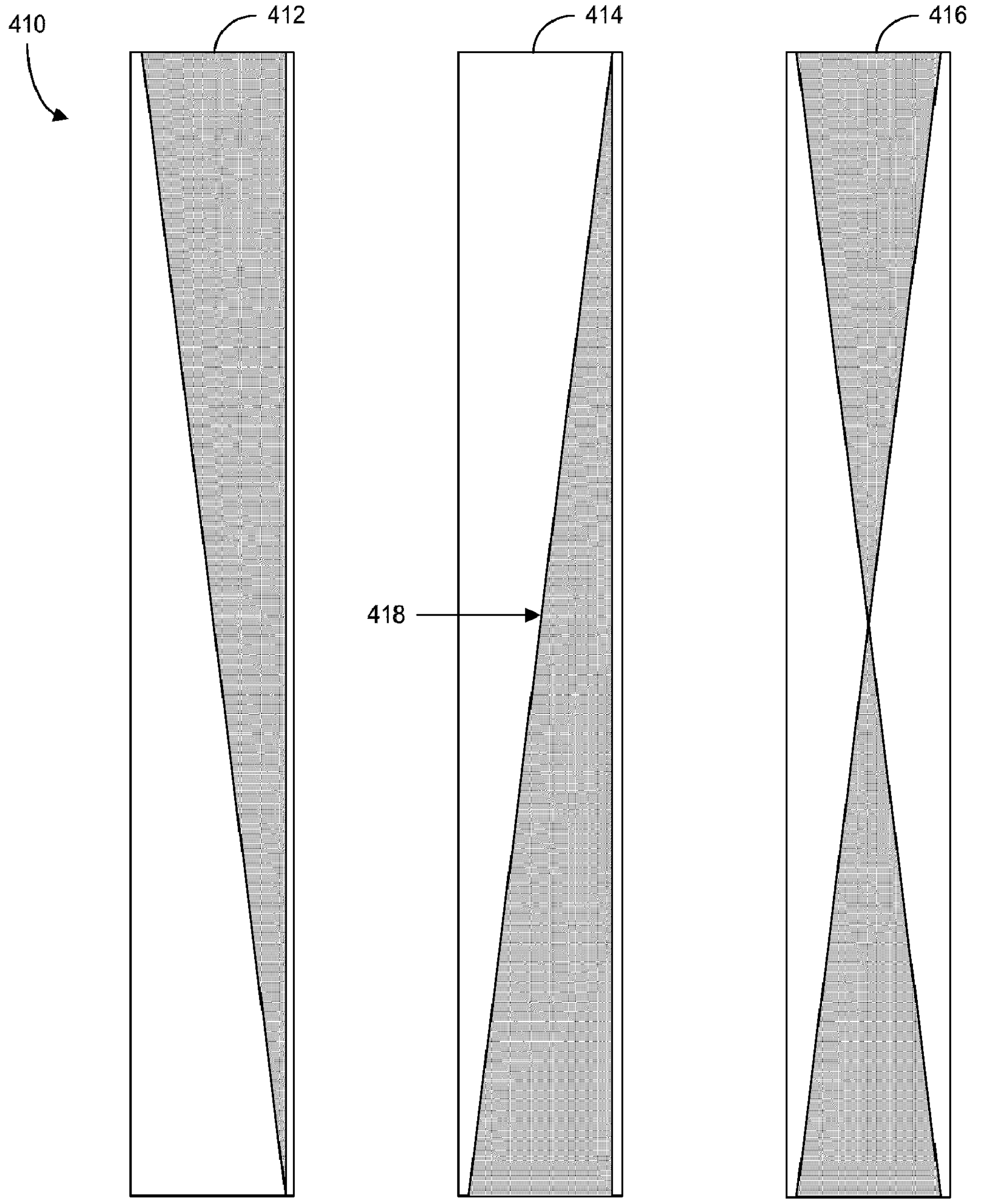
FIG. 4B is a reel strip configuration showing a visual continuum of outcomes based on width.

One embodiment of the reel strips of the present invention is shown in FIG. 4B. As in FIG. 4A, FIG. 4B shows a reel strip set 410 containing three reel strips 412, 414, and 416. Unlike the prior art reel strips, however, there are no discrete reel stops and no discrete symbols. Because of this lack of discrete reel stops, the motor which drives reels 132, 134, and 136 of the present invention should be capable of smooth rotation instead of stepped rotation. The symbols have been replaced with an indicium 418 representing a visual continuum of values, in this case, width. Thus, indicium 418 of reel strip 414 ranges from a minimum width of zero inches to a maximum of two inches. Because reel strip 414 may be rotated to an infinite number of positions, there are an infinite number of outcomes that may be represented by the reel. One advantage of such a broad range of reel positions is that the ratio of losing outcomes to winning outcomes can be made as large as desired, without presenting the player with a distorted picture of the probability of receiving a payout. Reels 412 and 416 are similarly configured, although the specific form of the indicium on each reel varies as to the exact width at each location on the reel. The functionality of these reels will be further discussed further with reference to FIG. 6 below.

Figure 4C:
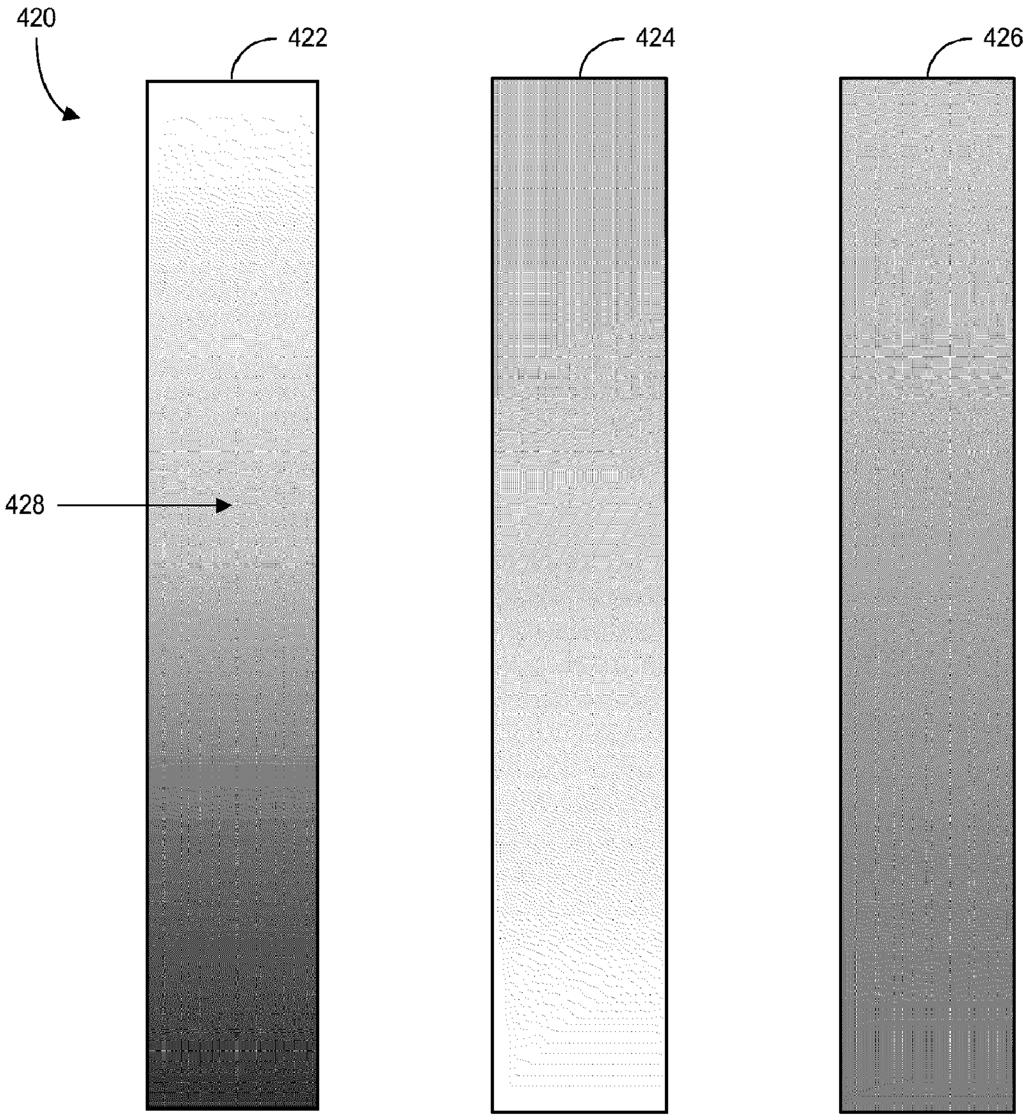
FIG. 4C is a reel strip configuration showing a visual continuum of outcomes based on grayscale.

Another reel strip embodiment of the present invention is shown in FIG. 4C. Reel strip set 420 includes reel strips 422, 424, and 426. Each of these reel strips displays a continuum of color (represented in grayscale), ranging from low wavelength to high wavelength. Color indicium 428 is directed to a portion of reel strip 422 indicating a particular wavelength. Associated with each wavelength is a specific value which may be summed to create a total wavelength value for the outcome. One advantage of this color embodiment is that the reels may be overlapping, with the point of intersection representing the winning outcome. In this manner, the final result of the game is not known until the final reel has stopped spinning.

Figure 4D:
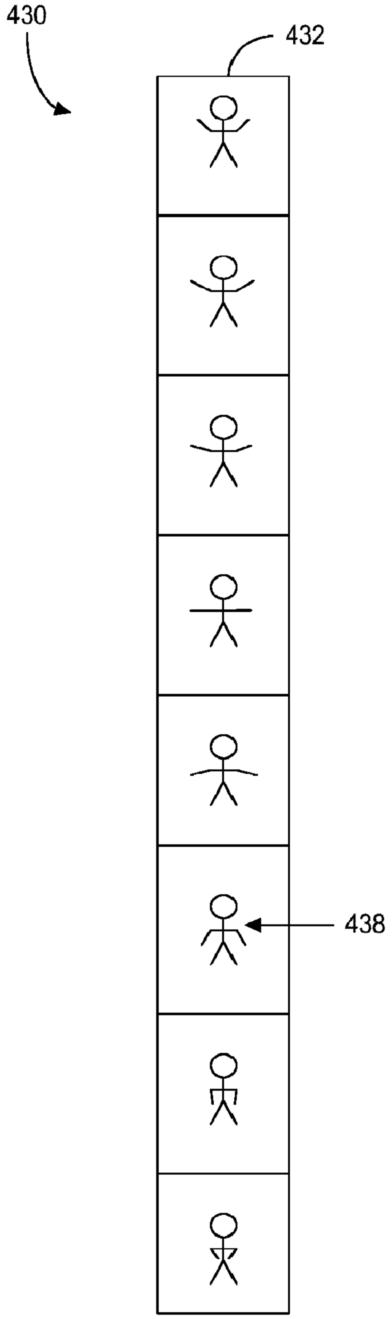
FIG. 4D is a reel strip configuration showing a series of frames from an animated sequence.

FIG. 4D illustrates an alternate representation of reel symbols. In this embodiment, reel strip set 430 contains three series of frames 432, 434, and 436, each represented in electronic form. Rather than being attached to a reel mechanism, these frames are presented to the player in much the same way that a motion picture or television image is presented to a viewer. Once one frame has been viewed it is quickly replaced by the next image, with image replacement fast enough to create the illusion of motion for the player. The player experiences a loop of video rather than a rotating reel, with the duration of the loop being limited only by the storage capability of data storage device 104. Frame 438 illustrates an individual frame element, in this example a stick figure. In this embodiment, the outcome is displayed as a series of three frames, with reel controller 116 stopping the video presentation of each reel when the appropriate reel frame position is currently viewable. A winning outcome might consist of three frames in which a stick figure had both arms raised in a particular position.

Figure 4E:
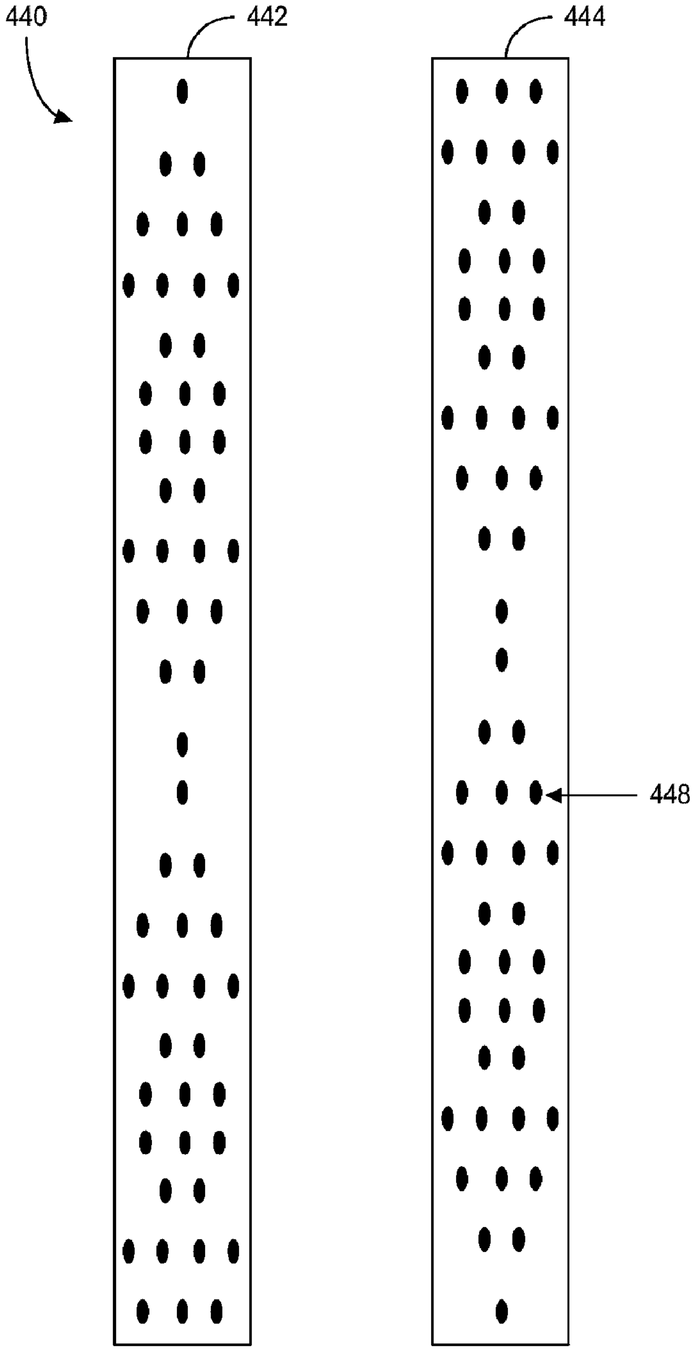
FIG. 4E is a reel strip configuration showing a series of additive elements.

FIG. 4E shows an additive embodiment of the present invention in which each reel has meaning only in its contribution to the total of the three reels. Reel strip set 440 includes reel strips 442, 444, and 446, each reel strip containing reel stops with a number of dots. Reel stop 448, for example, displays three dots. This configuration of reel strips is particularly appropriate for embodiments in which outcomes are represented by the sum of three reel positions. An individual reel stop such as 448 is relevant only in combination with corresponding reel stop symbols from reel strips 442 and 446.

Those of ordinary skill in the art will appreciate that there are many more reel strip configurations which may incorporate additive elements. In a playing card embodiment, the values of the cards may be added to achieve a total outcome with card values determined by the rules of blackjack or baccarat. A six, seven, and jack, for example, might result in a player total of twenty-three. This value could then be compared with a house total to determine whether the player had won. Another additive element is geometric symbols in which the number of sides of the symbol represents the outcome total (e.g. a triangle, square, and hexagon would total 3+4+6=13). Players might be paid for achieving a particular number of sides, offering players a simple payout structure that avoids the complexities of conventional payout tables that require more time to understand.

Figure 4F:
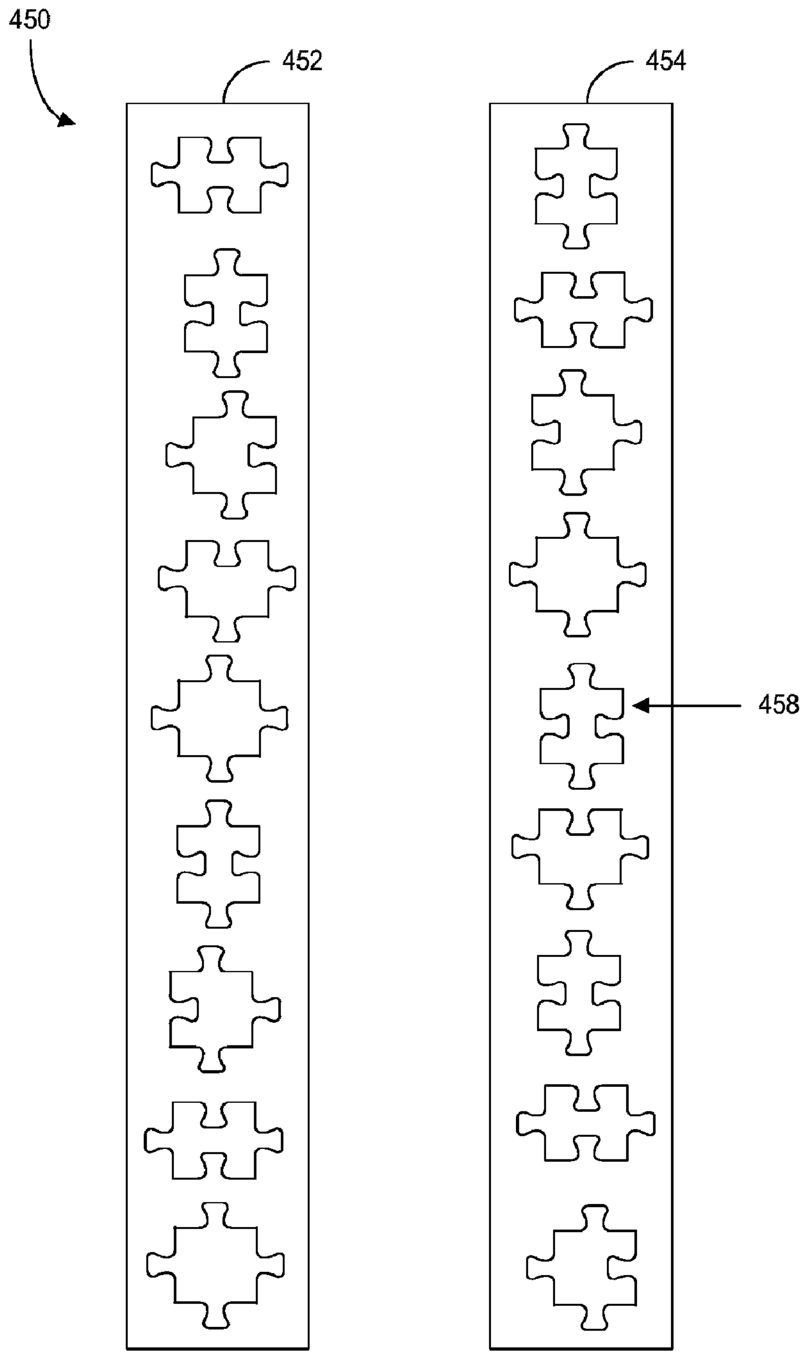
FIG. 4F is a reel strip configuration showing a series of interrelated elements.

"Turning now to FIG. 4F, there is illustrated an embodiment in which symbols from one reel strip interact with symbols from another reel strip. Reel strip set 450 contains reel strips 452, 454, and 456, each of which contains a puzzle piece, such as piece 458, at each reel stop location. The outcome of the slot play is a win for the player if all three puzzle pieces fit together. This embodiment is preferably electronically displayed so that the puzzle pieces may be animated, with video display 118 showing an animated interlocking process which succeeds or fails depending on the configuration of the pieces. FIG. 4G illustrates such an embodiment. In one embodiment, the pieces may be rotated and reordered on an electronic display so that the piece from reel strip 452 may interlock not just with the piece from reel strip 454 but also reel strip 456. One advantage of such an embodiment is that the player feels as though he is "in the game" until the final puzzle piece has been determined. Additionally, because the result of the outcome is not immediately apparent to the player, tension and excitement is created as the puzzle is formed."

Figure 5:
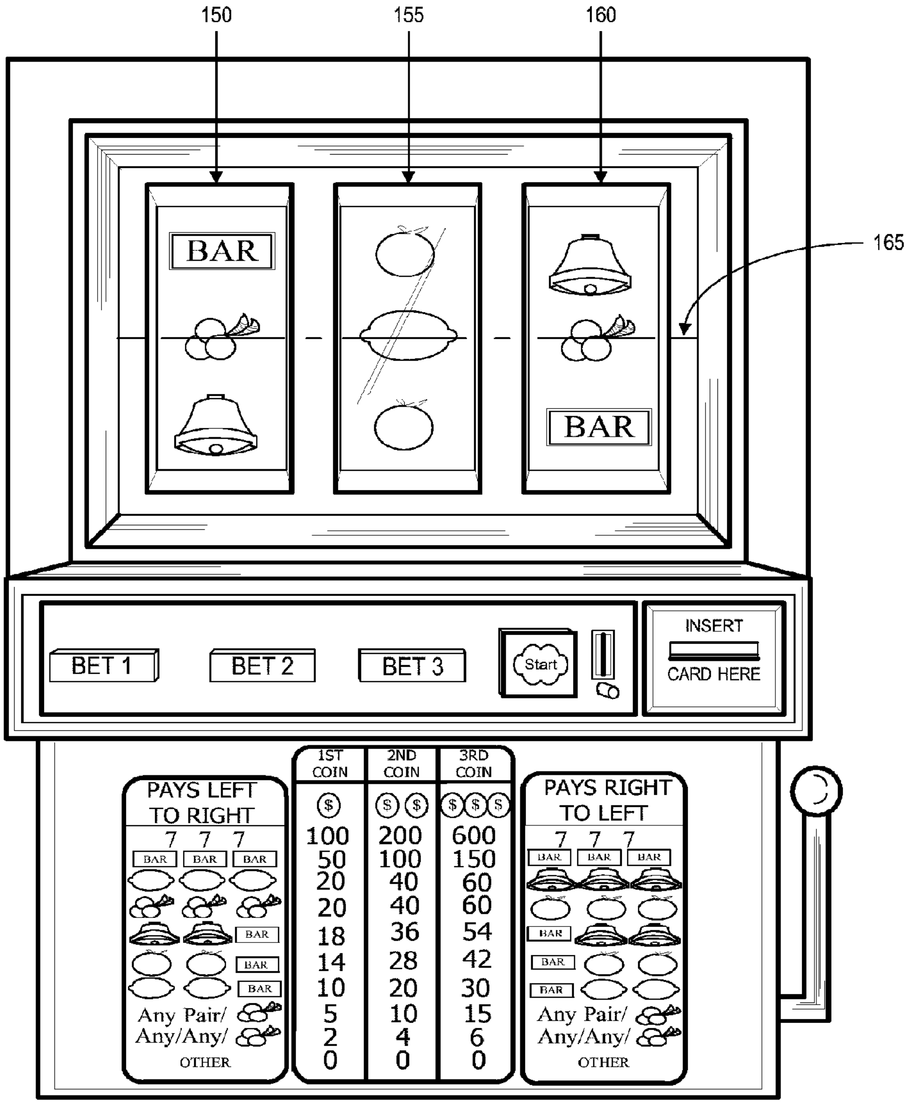
PRIOR ART FIG. 5
FIG. 5 is a plan view of a prior art slot machine.

Referring now to FIG. 5 there is shown a front plan view of a prior art slot machine as is well known in the art. Upon activation of the machine, reels 150, 155, and 160 rotate until the appropriate outcome symbols are displayed under payline 165. In this example, the displayed outcome is cherry/lemon/cherry. Symbols not under the payline have no bearing on the final outcome. Thus, as shown on reel 150, the bar and bell symbols have no impact on the resulting outcome and hence have no impact on the payout to the player. This slot machine offers a limited number of reel symbols, and offers no interactivity between reels.

Figure 6:
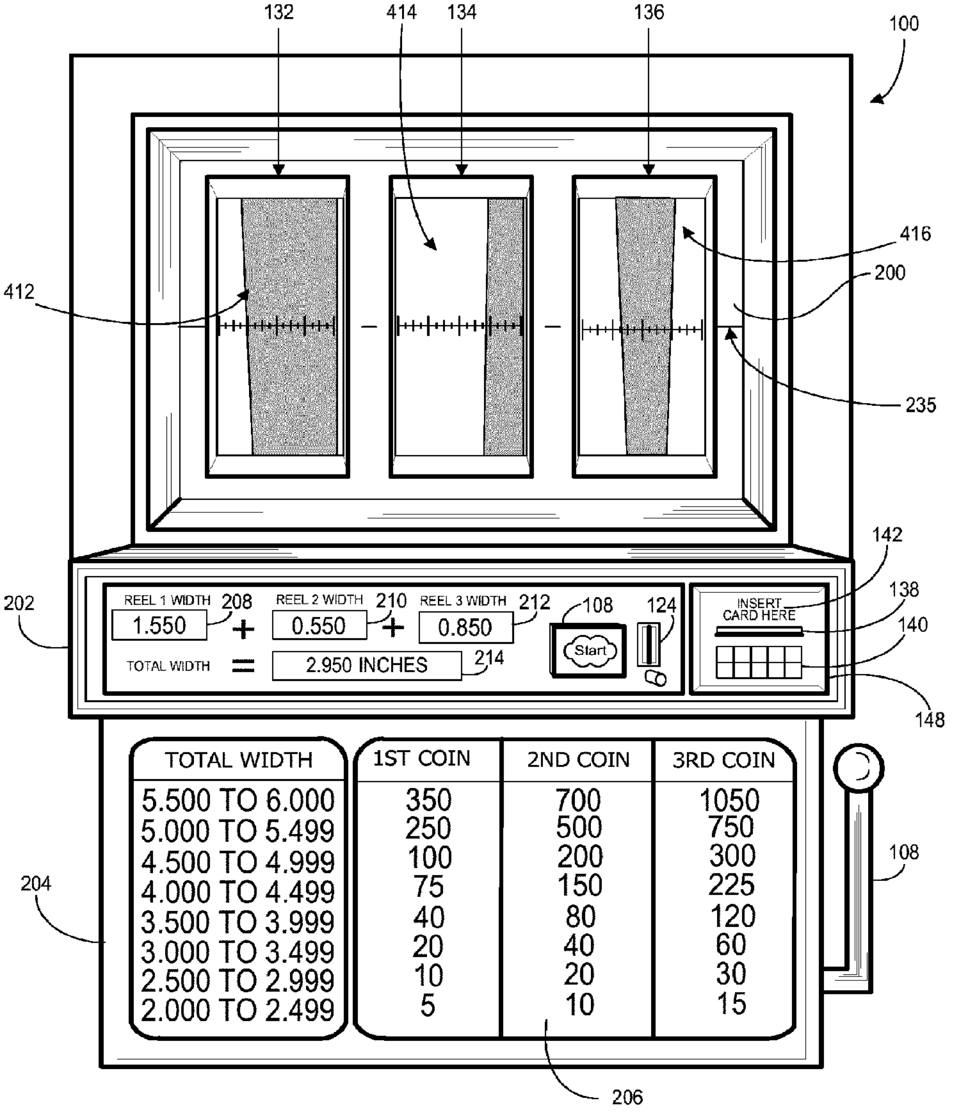
FIG. 6 is a plan view of a slot machine according to a first aspect of the present invention.

Referring now to FIG. 6, a front plan view is shown of slot machine 100 of the present invention which, for purposes of discussion, is generally divided into three sections: an upper panel 200, a central panel 202, and a lower panel 204. Upper panel 200 includes the display of first reel 132, second reel 134, and third reel 136. Each of these reels is configured to display the indicia of respective reel strips 412, 414, and 416 as illustrated in FIG. 4B. The reels may be mechanical in nature, or electronically represented with outputs shown on conventional electronic graphical media, such as LCD displays. Upper panel 200 includes a payline 235 which indicates the location on reel strips 412, 414, and 416 of the resultant outcome. In the present embodiment payline 235 includes measurement indications so as to facilitate the player's understanding of the resultant indicia width.

Central panel 202 houses player tracking device 148 including card reader 138, keypad 140, and display 142 shown set to read "INSERT CARD HERE." To the left of player tracking device 114 is positioned coin acceptor 124 and starting controller 108. In addition, there are four separate display areas which communicate outcome data to the player: reel one display 208, reel two display 210, reel three display 212, and total width display area 214. The value displayed in reel width display 208 indicates the width of reel strip 132 at the point at which it intersects payline 235. The value displayed in total width display 214 is the total width of all three reel strips and indicates the outcome of the slot play, in this case a total width of 2.950 inches, corresponding to a payout of ten coins for each coin wagered.

Lower panel 204 includes a pay table 206 which describes all possible payouts for the slot machine, the details of which were discussed with respect to FIG. 3B. The information is typically printed in bright colors and may be back-lit for easier viewing. Lower panel 206 may also include starting controller 108 (in the form of a handle).

Figure 7:
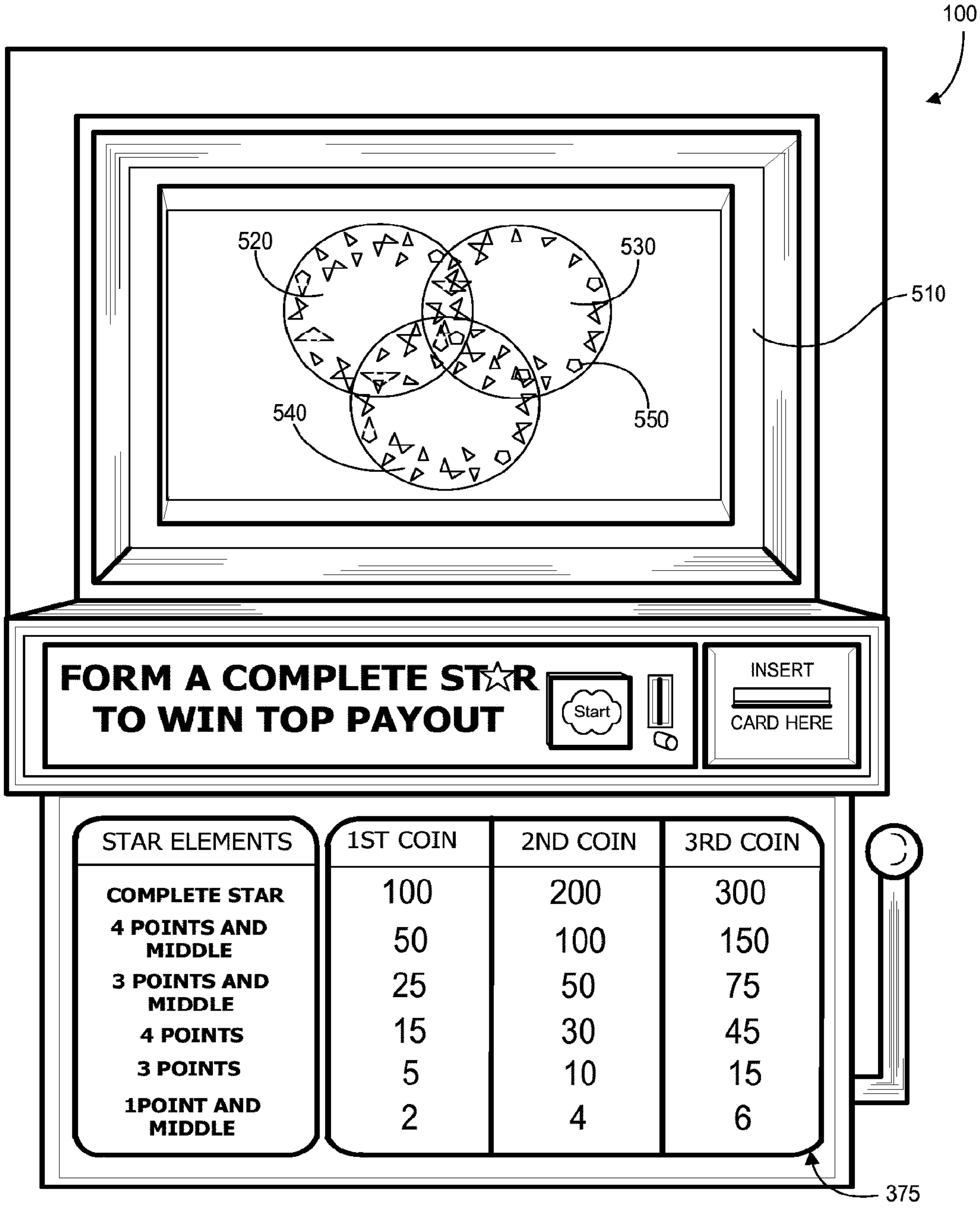
FIG. 7 is a plan view of a slot machine according to a second aspect of the present invention.
Figure 8:
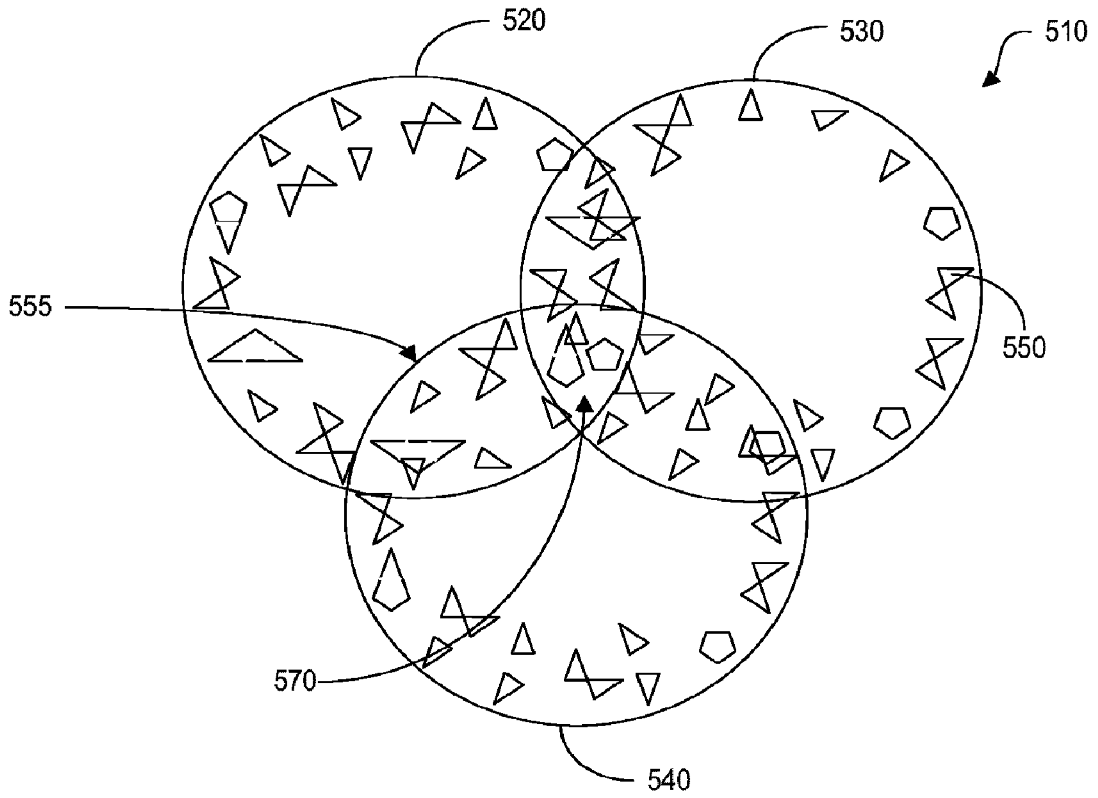
FIG. 8 is plan view of the intersecting reels of the slot machine of FIG. 7.

With reference now to FIGS. 7 and 8, there is illustrated an alternate embodiment of the present invention. FIG. 7 is a front plan view of slot machine 100 in which reels 132, 134, and 136 have been replaced with three overlapping disks: disk 520, disk 530, and disk 540. Each disk has indicia 550 that are imprinted on the outer portion of the disk. Each disk rotates on an axis, spinning either clockwise or counterclockwise. Although they may be mechanical in operation, the present embodiment incorporates a display area 510 suitable for a completely electronic representation.

FIG. 8 illustrates display area 510 in more detail, showing more specifically the functional elements of this disk embodiment. Disks 520 and 540 are at least partially translucent so that the symbol indicia of disks 530 and 540 can be viewed through disk 520. Boundary lines 555 are shown to better illustrate the precise location of each overlapping disk 520, 530, and 540. The intersection of disks 520, 530, and 540 form intersection symbol 570. Intersection symbol 570 represents not only the indicium of disk 520 but the combination of indicia from disks 530 and 540 at the overlapping area, thus intersection symbol 570 is an amalgamation of component indicia from all three disks. As the disks rotate, new intersection symbols 570 are continually formed within the intersection area. The disks may be operative to spin and stop in succession, with several seconds delay between the stopping of one disk and the next. Alternatively, all three disks may be operative to spin and stop simultaneously, allowing for a faster game. Payouts may be provided to the player for forming various objects, such as the top payout of three hundred coins for completing a star with a three coin play as shown in payout table 375 of FIG. 7.

Figure 9:
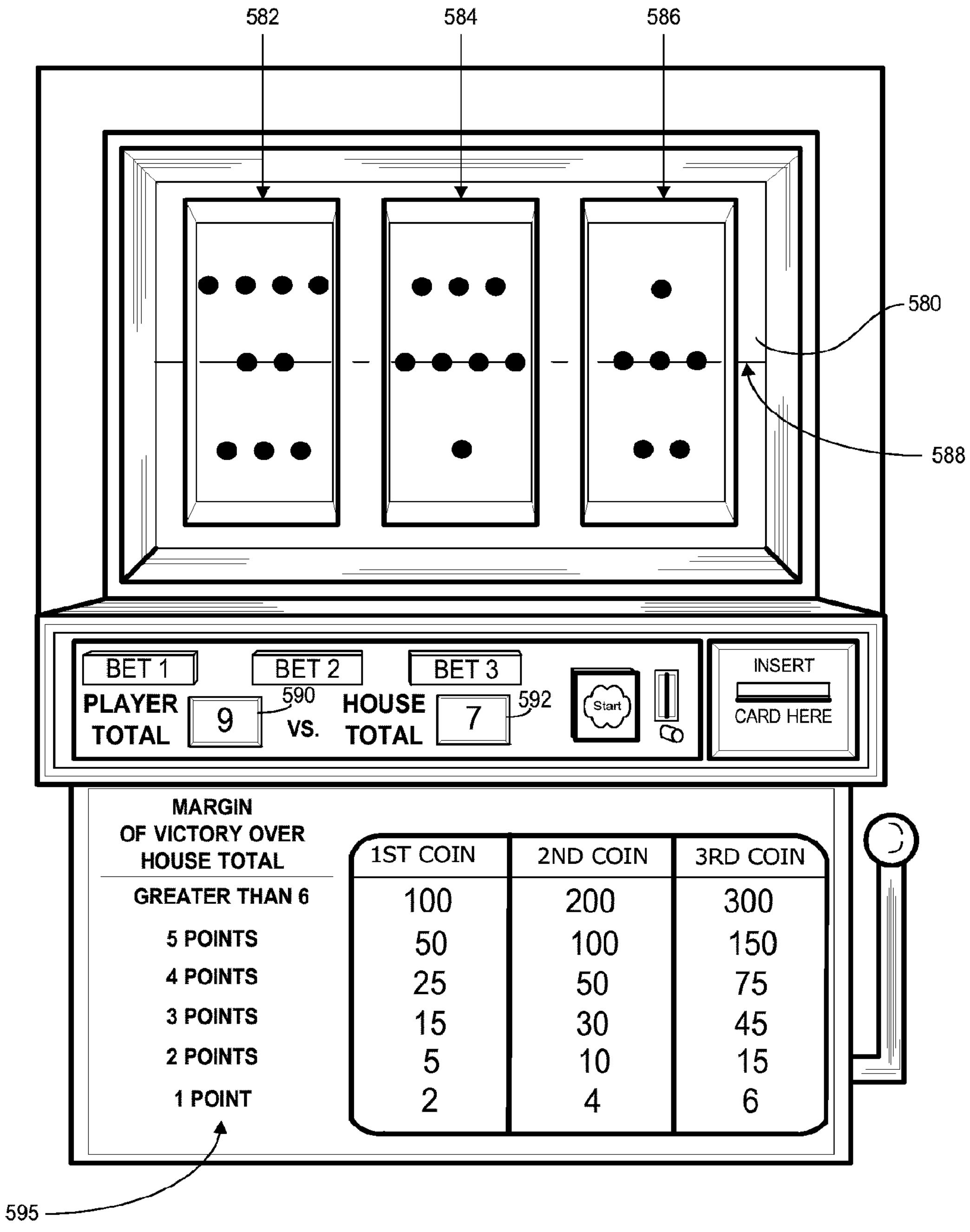
FIG. 9 is a plan view of a slot machine according to a third aspect of the present invention.

Referring now to FIG. 9, there is illustrated a front plan view of yet another embodiment of slot machine 100 in which symbols from each reel are added and then compared to a house total. Display area 580 contains a first reel 582, second reel 584, and third reel 586, each reel incorporating the respective symbols from reel strips 442, 444, and 446 of FIG. 4E. CPU 102 directs reel controller 116 to stop the reels at positions indicating the symbol configuration corresponding to the outcome identified in a stored probability table. In this embodiment, the probability table is similar to enhanced probability table 127, in which outcome field 172 stores outcomes appropriate for the reel types and payouts shown in FIG. 9. Specifically, outcome field 172 could store the margin of victory over the house total with CPU 102 employing random number generator 112 to arrive at the specific house total and player total. The player total comprises three separate components displayed using reel strips 582, 584, and 586. The sum of the number of dots under payline 588 represent the player total shown on player total display 590. The particular outcome for this game play also includes a house total, shown in house total display 592. In this outcome, player total display 590 shows "9" to reflect the reel strip symbols of two dots, four dots, and three dots. Since this player total is two more than the house total of "7," the player is awarded a payout of five coins for each coin bet as indicated by payout table 595.

Description of the Operation

Figure 10:
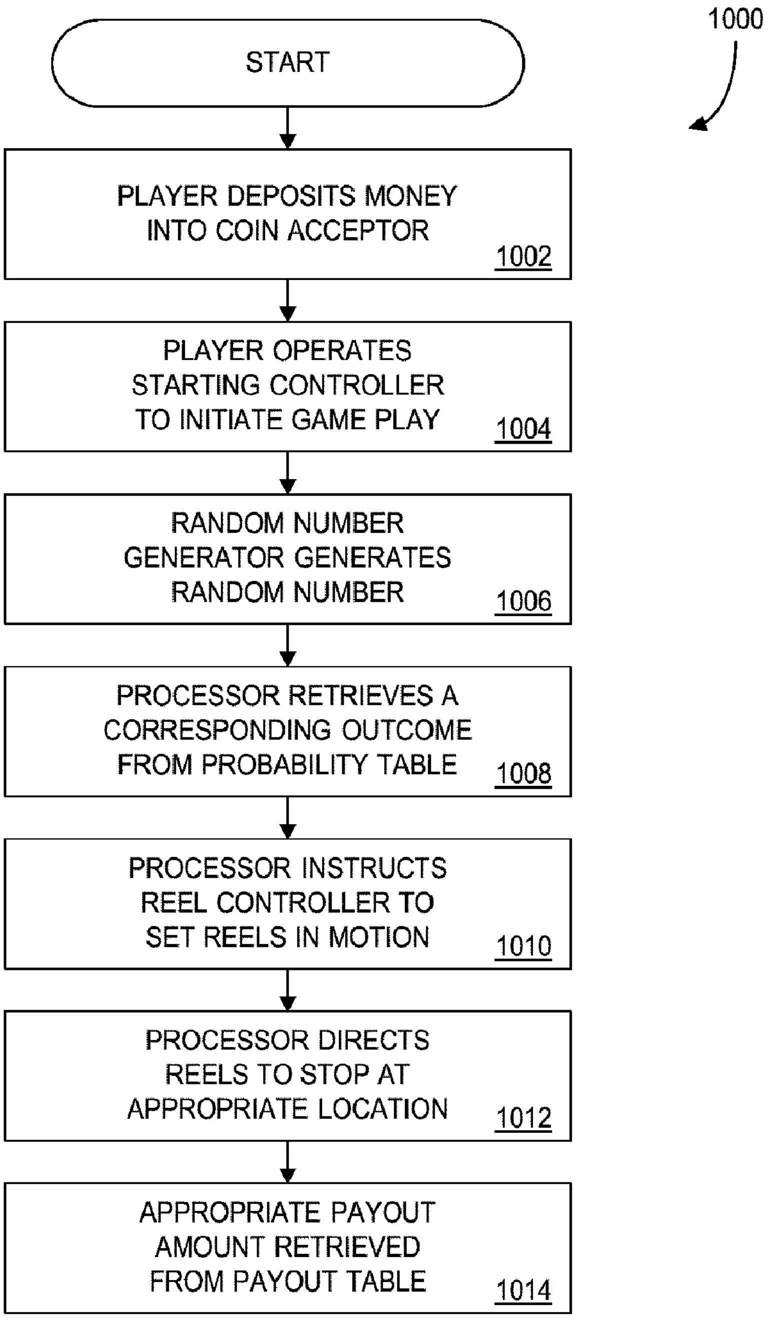
FIG. 10 is a flowchart illustrating a method of operating a slot machine in accordance with the present invention.

Referring now to FIG. 10, and with continuing reference to FIGS. 3A, 3B, 4B and 6, a process 1000, in the form of a flow chart, is shown for operating slot machine 100 in accordance with the present invention.

To enable a game play, a player must first deposit money into the slot machine. This can be accomplished by inserting coins into coin acceptor 124 (step 1002). To initiate a game play, a player operates the starting controller 108 of slot machine 100, in this case by pulling a handle (step 1004). Responsive to the starting of the game, a random number is obtained from random numbers generator 112 (step 1006). It will be understood that this random number can be generated specifically for the game, or may be selected from a series of random numbers being generated on a consistent or periodic basis by random number generator 112. Many methods of generating random numbers are well known in the art.

Subsequent to the generation of a random number for the game play, that random number is used in conjunction with enhanced probability table 127 to identify the record and hence the outcome corresponding to the generated random number (step 1008). For example, the random number 9998 would fall in the range designated by record 187*f*, identifying the outcome "3.000-3.499." CPU then instructs reel controller 116 (step 1010) to rotate first reel 132, second reel 134, and third reel 136 and to stop their rotation (step 1012) at a point when the appropriate location is displayed to the player under the payline.

Those of ordinary skill in the art will appreciate that there are many ways in which outcome 172 may be displayed to the player via reels 132, 134, and 136. In one embodiment, random number generator 112 produces a further random number which identifies the precise value within the range identified by outcome field 172 of the appropriate record of enhanced probability table 127. For example, for outcome range "3.000-3.499" CPU 102 may identify a precise value of 3.264 for display to the player. Because this precise value is the total of all three reels, it is first broken into three separate numbers, each number representing a width to be displayed using reels 132, 134, and 136. In one embodiment, the precise number 3.264 is divided by three to obtain three values of 1.088. A further random number then determines an amount to vary the width displayed by the first and third reel (reels 132 and 136) so that each of reels 132, 134, and 136 displays a different value. For example, the number 0.456 may be selected as a varying factor, added to reel 132 and subtracted from reel 136 resulting in widths of 1.544, 1.088, and 0.632 for display on reels 132, 134, and 136 respectively.

The outcome along with the wager value is then used to identify the corresponding payout value from enhanced payout table 129 (step 1014), in this example record 136*f* of one coin field 176 for a payout of twenty coins. CPU 102 then directs hopper controller 122 to dispense coins corresponding to the twenty coin payout from hopper 130 at which point slot machine 100 is ready for the initiation of the next game play.

While the best mode for carrying out the invention has been described in detail, those familiar with the art to which the invention relates will recognize various alternative designs and embodiments for practicing the invention. These alternative embodiments are within the scope of the present invention. Accordingly, the scope of the present invention embodies the scope of the claims appended hereto.

What is claimed is:

1. A computer-readable medium encoded with a program for implementing a method, said program for directing a gaming device to:

initiate a paid play;

determine an outcome of said paid play;

visually display said outcome on at least first graphical display area and a second graphical display area, said first and second graphical display areas comprising respective first and second visual continuums and each said first and second graphical display areas lacking multiple discrete unconnected symbols, said first and second visual continuums each including a continuous image, wherein said outcome is represented by the relative positions of said first and second visual continuums;

wherein the payout is determined by comparing relative positions of the first and second visual continuums to a payline; and determine a payout based on said outcome.

2. The computer-readable medium of claim 1, wherein said first and second visual continuums are disposed on rotatable reels.

3. The computer-readable medium of claim 1, wherein the first graphical display area and the second graphical display area each comprises a respective reel strip of a mechanical reel slot machine.

4. The computer-readable medium of claim 1, wherein the first graphical display area and the second graphical display area each comprises a respective portion of a video display of a video slot machine.

5. The computer-readable medium of claim 1, wherein said first and second visual continuums are displayed on electronic graphical displays.

6. The computer-readable medium of claim 1, wherein each of said first and second visual continuums comprises a respective continuum of color.

7. The computer-readable medium of claim 1, wherein each of said first and second visual continuums comprises a respective continuum of a physical dimension.

8. The computer-readable medium of claim 7, wherein said physical dimension comprises a width.

9. The computer-readable medium of claim 1, wherein each said continuous image is capable of gradually changing its viewable appearance during game play of the gaming device.

10. The computer-readable medium of claim 1, wherein each said continuous image is capable of continuously changing its viewable appearance during game play of the gaming device.

11. A computer-readable medium encoded with a program for implementing a method, said program for directing a gaming device to:

initiate a paid play;

determine an outcome of said paid play;

display a first animated representation on a first graphical display area, said first animated representation creating an appearance of a first visual continuum comprising a continuous image and said first graphical display area lacking multiple discrete unconnected symbols;

display a second animated representation on a second graphical display area, said second animated representation creating an appearance of a second visual continuum comprising a continuous image and said second graphical display area lacking multiple discrete unconnected symbols, wherein said first animated presentation is identical to said second animated presentation;

halt said first and second animated representations to display said outcome; and determine a payout based on said outcome.

12. The computer-readable medium of claim 11, wherein the first graphical display area and the second graphical display area each comprises a respective reel strip of a mechanical reel slot machine.

13. The computer-readable medium of claim 11, wherein the first graphical display area and the second graphical display area each comprises a respective portion of a video display of a video slot machine.

14. A method of operating a gaming device, comprising:

initiating a paid play;

determining, based on a random number, an outcome of said paid play;

displaying said outcome via at least a first graphical display area and a second graphical display area, wherein said first graphical display area comprises a first visual continuum and said second graphical display area comprises a second visual continuum, wherein said first graphical display area and said second graphical display area each lacks multiple discrete unconnected symbols, wherein said first visual continuum and said second visual continuum each includes a continuous image, and further wherein said outcome is represented by the relative positions of said first visual continuum and said second visual continuum, wherein determining the outcome comprises comparing relative positions of the first and second visual continuums to a payline; and determining a payout based on said outcome.

15. The method of claim 14, wherein the gaming device comprises a slot machine, and wherein the first graphical display area comprises at least one of a reel strip and a portion of a video monitor of the gaming device, and wherein the second graphical display area comprises at least one of a reel strip and a second portion of the video monitor of the gaming device.

16. The method of claim 14, wherein each of said first and second visual continuums comprises a respective continuum of color.

17. The computer-readable medium of claim 14, wherein each of said first and second visual continuums comprises a respective continuum of a physical dimension.

18. The computer-readable medium of claim 17, wherein said physical dimension comprises a width.

19. A computer-readable medium encoded with a program for implementing a method, said program for directing a gaming device to:

initiate a paid play;

determine an outcome of said paid play;

visually display said outcome on at least first graphical display area and a second graphical display area, said first and second graphical display areas comprising respective first and second visual continuums and each said first and second graphical display areas lacking multiple discrete unconnected symbols, said first and second visual continuums each including a continuous image, wherein said outcome is represented by the relative positions of said first and second visual continuums; and determine a payout based on said outcome, wherein said first and second visual continuums are disposed on rotatable reels.

20. A computer-readable medium encoded with a program for implementing a method, said program for directing a gaming device to:

initiate a paid play;

determine an outcome of said paid play;

visually display said outcome on at least first graphical display area and a second graphical display area, said first and second graphical display areas comprising respective first and second visual continuums and each said first and second graphical display areas lacking multiple discrete unconnected symbols, said first and second visual continuums each including a continuous image, wherein said outcome is represented by the relative positions of said first and second visual continuums; and determine a payout based on said outcome, wherein the first graphical display area and the second graphical display area each comprises a respective reel strip of a mechanical reel slot machine.

21. A computer-readable medium encoded with a program for implementing a method, said program for directing a gaming device to:

initiate a paid play;

determine an outcome of said paid play;

display a first animated representation on a first graphical display area, said first animated representation creating an appearance of a first visual continuum comprising a continuous image and said first graphical display area lacking multiple discrete unconnected symbols;

display a second animated representation on a second graphical display area, said second animated representation creating an appearance of a second visual continuum comprising a continuous image and said second graphical display area lacking multiple discrete unconnected symbols;

halt said first and second animated representations to display said outcome; and determine a payout based on said outcome, wherein the first graphical display area and the second graphical display area each comprises a respective reel strip of a mechanical reel slot machine.

22. A computer-readable medium encoded with a program for implementing a method, said program for directing a gaming device to:

initiate a paid play;

determine an outcome of said paid play;

display a first animated representation on a first graphical display area, said first animated representation creating an appearance of a first visual continuum comprising a continuous image and said first graphical display area lacking multiple discrete unconnected symbols;

display a second animated representation on a second graphical display area, said second animated representation creating an appearance of a second visual continuum comprising a continuous image and said second graphical display area lacking multiple discrete unconnected symbols, wherein the outcome is determined by comparing relative positions of the first and second visual continuums to a payline;

halt said first and second animated representations to display said outcome; and determine a payout based on said outcome.

23. The computer-readable medium of claim 22 wherein said first animated presentation is identical to said second animated presentation.

24. The computer-readable medium of claim 22 wherein the first graphical display area and the second graphical display area each comprises a respective reel strip of a mechanical reel slot machine.

25. The computer-readable medium of claim 22 wherein the first graphical display area and the second graphical display area each comprises a respective portion of a video display of a video slot machine.

26. The computer-readable medium of claim 22 wherein said first and second visual continuums are disposed on rotatable reels.

27. The computer-readable medium of claim 22 wherein said first and second visual continuums are displayed on electronic graphical displays.

* * * * *